United States Patent
Lawande

(10) Patent No.: US 6,842,797 B1
(45) Date of Patent: Jan. 11, 2005

(54) USB ADAPTER FOR BURST MODE COMMUNICATIONS

(75) Inventor: Sachin Lawande, Schaumburg, IL (US)

(73) Assignee: 3Com Corporation, Marlborough, MA (US)

( * ) Notice: Subject to any disclaimer, the term of this patent is extended or adjusted under 35 U.S.C. 154(b) by 768 days.

(21) Appl. No.: 09/685,287

(22) Filed: Oct. 10, 2000

(51) Int. Cl.[7] .............................................. G06F 13/00
(52) U.S. Cl. .............................. 710/35; 710/8; 710/46; 710/56; 710/62
(58) Field of Search ............................. 710/8, 46, 56, 710/62, 35, 63

(56) References Cited

U.S. PATENT DOCUMENTS

| 5,832,492 A |   | 11/1998 | Wooten ...................... 701/101 |
| 5,978,858 A | * | 11/1999 | Bonola et al. .................. 710/1 |
| 6,021,129 A | * | 2/2000 | Martin et al. .......... 370/395.72 |
| 6,061,687 A |   | 5/2000 | Wooten ...................... 701/101 |
| 6,128,673 A | * | 10/2000 | Aronson et al. .............. 710/22 |
| 6,370,603 B1 | * | 4/2002 | Silverman et al. ............ 710/72 |
| 6,523,081 B1 | * | 2/2003 | Karlsson et al. ............ 710/305 |
| 6,584,519 B1 | * | 6/2003 | Russell ........................ 710/62 |
| 6,647,438 B1 | * | 11/2003 | McVay et al. ................ 710/22 |

OTHER PUBLICATIONS

"Open Host Controller Interface Specification For USB", Compaq, Microsoft, National Semiconductor, Release 1a, Sep. 14, 1999, pp. ii to 146.

* cited by examiner

Primary Examiner—Jeffrey Gaffin
Assistant Examiner—Alan Chen
(74) Attorney, Agent, or Firm—McDonnell Boehnen Hulbert & Berghoff LLP

(57) ABSTRACT

Disclosed is device and method for improved burst communication on a USB bus. In one embodiment, a USB Ethernet adapter device uses the USB Interrupt Channel to send a message to an Ethernet class driver, via the host USB stack, that the Ethernet adapter device has data to transmit on the USB. The interrupt message preferably includes the size of the data packet to be transmitted or the number of packets to send. The class driver responds by instructing the USB stack to configure a new Transfer Descriptor having buffer pointers of sufficient size for the data packet. The USB Host Controller then processes the Transfer Descriptor, thereby inviting the Ethernet adapter device to transmit its data and responsively storing the data in the predetermined buffer.

20 Claims, 8 Drawing Sheets

USB ADAPTER FOR BURST MODE COMMUNICATIONS

FIELD OF INVENTION

The invention relates to communication systems, in particular, communication via a Universal Serial Bus (USB). More particularly, the invention relates to an improved burst communication adapter, such as an Ethernet adapter, for use on a USB bus.

BACKGROUND OF THE INVENTION

The USB provides a communication system for the transfer of data between devices in a host system, such as a personal computer or similar microprocessor based system. FIG. 1 illustrates an example of a system 100 that utilizes a Universal Serial Bus 142 to communicate with peripheral units 150, 160 and 170. A processor 110 sends and receives data through a host system bus 114 via a memory management unit (MMU) 112. Also connected to host system bus are host system memory 120 and USB host controller (HC) 140. The USB Host Controller (HC) is a hardware device that handles communication between the host system and peripheral devices, such as devices 150, 160 and 170, coupled to the USB 142. Note that each device 150, 160 and 170 is connected to a unique USB port and do not share the actual physical communication medium.

The USB Host Controller (HC) transfers data between the host system bus 114 and the USB 142 by providing an interface between a software driver (the Host Controller Driver (HCD)), resident on the host system microprocessor 110 and host system memory 120, and the Universal Serial Bus (USB) 142. The Host Controller processes data lists constructed by the HCD for data transmission over the USB and typically stored in host system memory 120.

Prior art USB communication systems for bursted communication channels, such as for a USB-Ethernet adapter 160, typically operate by performing bulk data transfers. This is done by the class driver issuing a bulk-in command or bulk read command for the endpoint device. On an OHCI based system, the USB stack then defines a Transfer Descriptor having an appropriate size buffer, and associating that Transfer Descriptor with the burst communication device's Bulk-type Endpoint Descriptor. While the prior art techniques include communication devices using an interrupt channel to provide link status information, it was not used to convey information regarding the presence of data. While providing an adequate data transfer mechanism, the prior art technique has a disadvantage in that a bulk endpoint transfer descriptor may potentially be processed many times in a given bus cycle, or frame (or across many such frames), which results in host system resources being occupied during the time that the HC is retrieving the EDs and TDs over system bus 114. Therefore, a more efficient approach to communication over the USB is desirable.

SUMMARY OF THE INVENTION

In accordance with preferred embodiments of the present invention, some of the problems associated with selecting a network resource in the prior art are overcome.

An embodiment of a method, according to the present invention, for transferring data over a Universal Serial Bus (USB) calls for polling a burst communication adapter device coupled to the USB using a first type of channel for the burst communication adapter device. The method also sets forth receiving a reply message from the burst communication adapter device, the reply message indicating that the burst communication adapter device has data for transfer via a second type of channel for the burst communication adapter device. The method further includes, responsive to receiving the reply message, creating a bulk-in read command, which may take the form of creating a Transfer Descriptor (TD) and linking the TD to an Endpoint Descriptor corresponding to the second type of channel for the burst communication adapter device.

An embodiment of a system, according to the present invention, for transferring data via a Universal Serial Bus (USB) includes a host system bus, a memory device coupled to the host system bus; and a Universal Serial Bus (USB). A host controller is coupled to the host system bus and the USB, the host controller being configured to process communications between the USB and the host system bus according to a predetermined endpoint descriptor list residing in the memory device. The system also includes an endpoint device coupled to the USB. The burst communication adapter device is configured to receive a polling message via a first type of channel of the USB and, responsive thereto, send a reply message when the burst communication adapter device has data for transfer via a second type of channel of the USB, where the second type of channel of the burst communication adapter device corresponds to the predetermined endpoint descriptor list. The system further includes a microprocessor coupled to the host system bus. The microprocessor has a class driver configured to send the polling message through the first type of channel of the USB via the host controller. Alternatively, the USB stack on the host initiates the polling message (without the need for continual instructions from the class driver) in accordance with the interrupt endpoint descriptor for the burst communication adapter. The class driver is further configured to receive the reply message and, responsive thereto, create a bulk-in read command. This may take the form of a transfer descriptor created by the host USB stack, which is then attached to the predetermined endpoint descriptor list.

In a further embodiment, the universal serial bus communications system is an adapter that includes an ethernet physical layer transceiver having an associated ethernet MAC protocol process, a USB driver in communication with the MAC process, where the USB driver includes an interrupt channel process and a bulk transfer channel process. The adapter also includes a USB physical layer in communication with the USB driver, and the USB physical layer is adapted for communication with a USB host device. Upon receipt of an ethernet packet addressed to the ethernet adapter, the ethernet adapter transmits a data present signal via the interrupt channel process.

The preferred adapter also includes a class driver software module adapted for running on a host computing platform, wherein the class driver software includes instructions to issue a bulk-in read command in response to an interrupt reply message.

The foregoing and other features and advantages of the present invention will be more readily apparent from the following detailed description of an embodiment of the present, invention, which proceeds with references to the accompanying drawings.

BRIEF DESCRIPTION OF THE DRAWINGS

Particular embodiments of the present invention are described below with reference to the following drawings, wherein.

Note that elements that are related to one another in the drawings are identified using the same or similar reference numbers.

DETAILED DESCRIPTION OF PREFERRED EMBODIMENTS

The present invention is directed toward an improved method and system for transferring data using a USB. This invention relates to the Universal Serial Bus, many aspects of which are set forth in the Universal Serial Bus Specification, Version 1.1, Sep. 23, 1998, which is incorporated herein by reference and is available from the USB Implementers Forum, Inc. Additional aspects of the USB bus can be found in the OHCI specification, OpenHCI—Open Host Controller Interface Specification for USB, Revision 1.0a, October 1996, which is also incorporated by reference herein and is available from the USB Implementers Forum, Inc.

Figure 1:
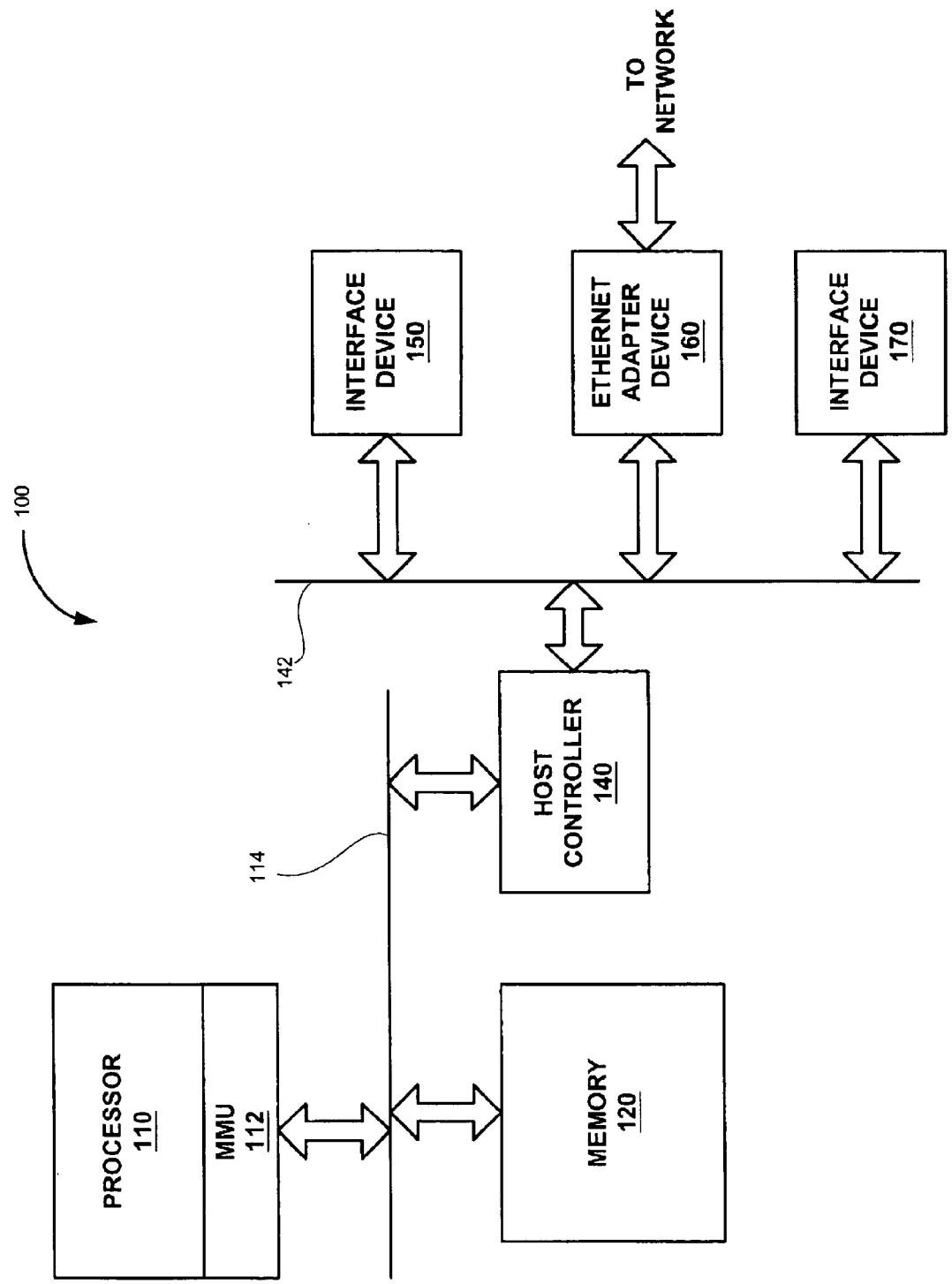
FIG. 1 is a functional block diagram illustrating an example of a conventional architecture for a host system configured to communicate with a network via an Ethernet device coupled to the host system via a USB.
Figure 2:
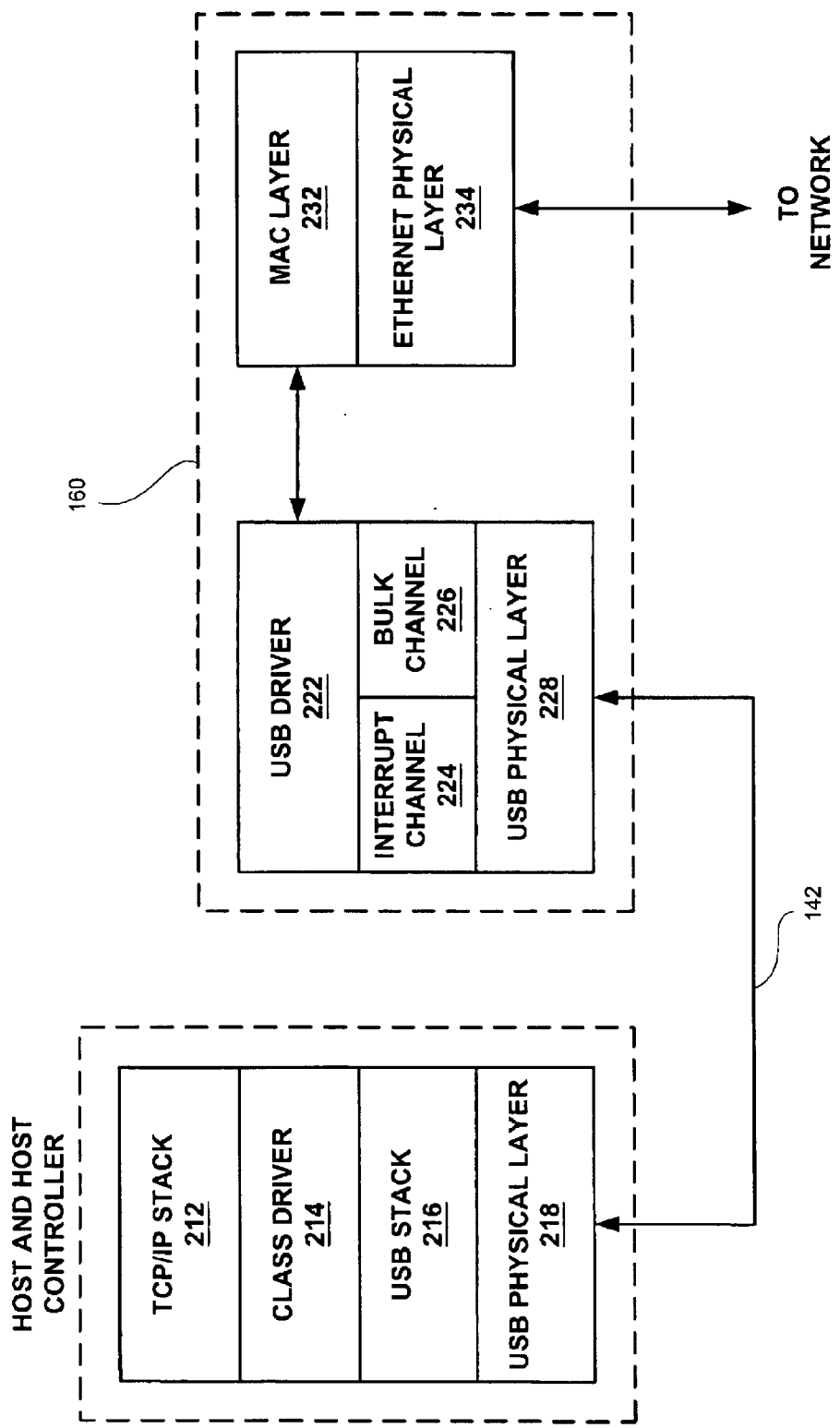
FIG. 2 is a protocol stack diagram illustrating an embodiment of a host system, such as, the microprocessor based system with host controller of FIG. 1, and endpoint device, such as the Ethernet Adapter of FIG. 1, according to the present invention.

FIG. 2 is a protocol stack diagram illustrating an embodiment of a host system and endpoint device according to the present invention. FIG. 2 illustrates the relationship between protocol entities in the host system of microprocessor 110, Host Controller 140, which is part of the USB physical layer 218, and Ethernet adapter device 160 of FIG. 1. The host system stack includes a TCP/IP stack 212 for communication over a network connected to Ethernet device 160. A class driver 214 exists for each device attached to USB 142. A USB stack 216 handles communications with each device attached to the USB bus 142. A USB physical layer 218 of Host Controller 140 handles the physical transmission to a USB physical layer 228 of Endpoint Device 160 over bus 142. In HC 140, each device is provided with capability for a bulk, interrupt, control, and isochronous channel for each direction of transmission in accordance with the USB Specification.

A USB driver 222 handles communications with each of the devices attached to the USB 142, such as Ethernet device 160. The Endpoint Device 160, e.g. an Ethernet device or other burst communication device (such as a baseband device or burst modem employing one of many well known modulation formats, including for example QAM, PSK, DMT, CAPM, direct-sequence or frequency hop spread spectrum), includes a USB physical layer 228, a USB stack including a transmit interrupt channel 224 and a transmit bulk channel 226, and a USB driver 222. The Media Access Control (MAC) layer 232 communicates with the USB driver 222 and handles low level communications through Ethernet physical layer 234 to a network to which the host system is attached via the Ethernet device.

Typically, the HC 140 resides in a host computing system that includes an operating system component for configuring the HC 140 and the HCD for managing the operation of USB 142. The operating system typically loads the HCD, locates and verifies the HC, allocates system resources, and sets up the HC registers. The HC registers are a set of Operational Registers that are accessed using memory references via a non-cached virtual pointer. One such register is the HcHCCA.

The HcHCCA register, which is maintained by the HCD, contains a pointer to the Host Controller Communication Area (HCCA), which is a data structure in shared main memory 120 for communication between the HCD and the Host Controller 140. The Host Controller Communications Area (HCCA) is a 256-byte structure of system memory that is used by system software to send and receive specific control and status information to and from the HC. System software writes the address of this structure in HcHCCA in the HC. The HCCA data structure allows the HCD software to direct the HC's functions without having to read from the Host Controller except in unusual circumstances (e.g., error conditions). Normal interaction with the Host Controller can be accomplished by writing to the structure, by reading values from this structure that were written by the Host Controller, and by writing to the HC's operation registers.

The Host Controller 140 processes communication requests in the form of Endpoint Descriptors (EDs) and Transfer Descriptors (TDs) stored in the HCCA. Each Endpoint Descriptor defines a communication link on the USB. Each endpoint is one of the four types noted above—interrupt, bulk, control and isochronous.

Figure 3:
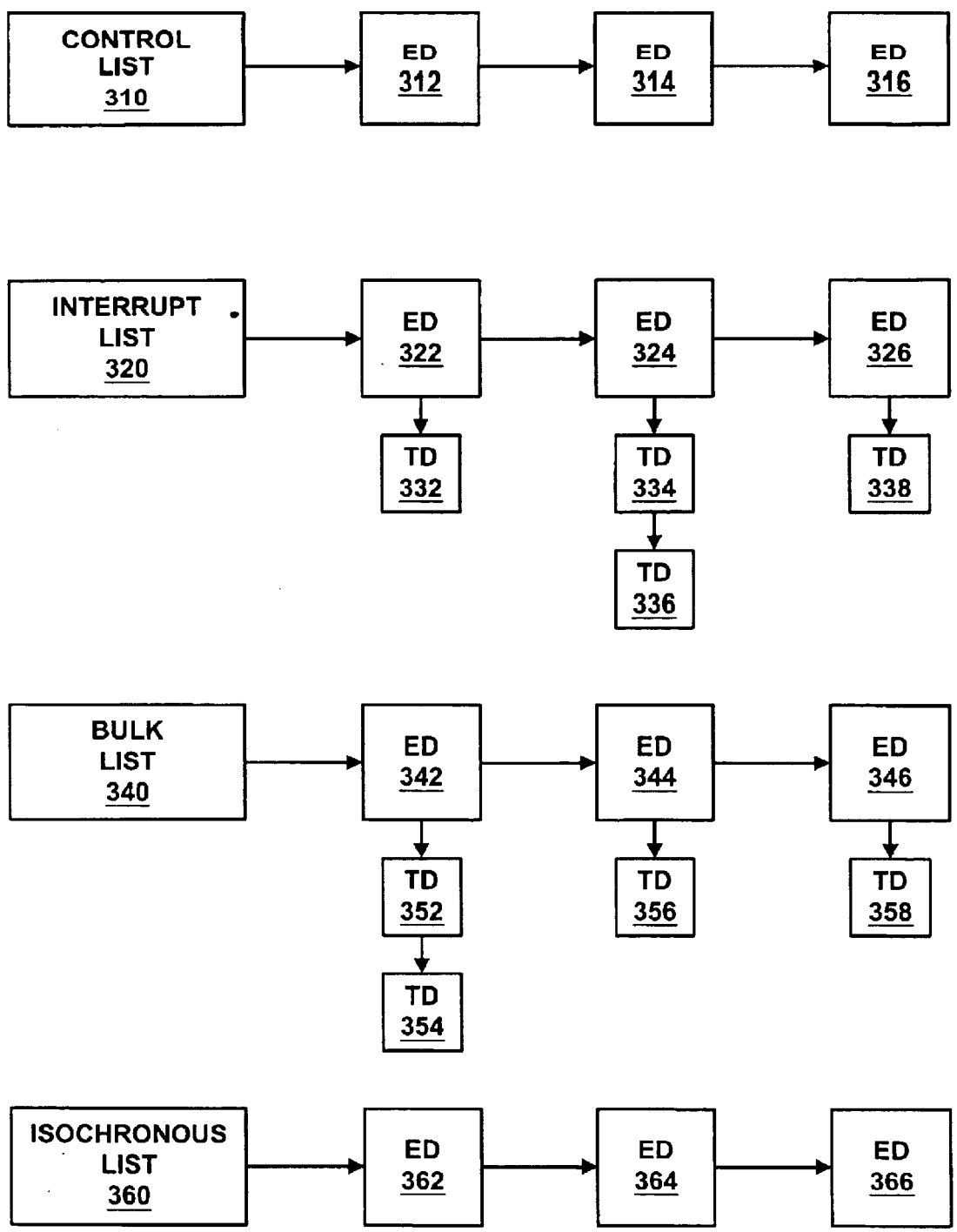
FIG. 3 is a data structure diagram illustrating an example of process lists used by the host controller of FIG. 1 for the processing of data transfers via the USB.

FIG. 3 illustrates an example of the USB process lists residing in main memory 120 for processing communications in the HC 140. The process lists include a control list headcell 310, an interrupt list headcell 320, a bulk list headcell 340 and an isochronous headcell 360. Each headcell, in turn, is linked to the endpoint descriptors for the corresponding channels. For the example shown in FIG. 3, the control list 310 includes control endpoint descriptors 312, 314 and 316, one endpoint descriptor for each direction of transmission for each device coupled to USB 142. Note that FIG. 3 has been simplified and, for the three devices in FIG. 1, there would be six Control EDs. (3×2).

Each endpoint descriptor (ED) has an associated queue of Transfer Descriptors (TDs), which in turn define specific communication tasks to be done on the USB. In FIG. 3, for example, ED 322 on the interrupt list 320 has a TD 332 linked to it. Similarly, ED 324 has TDs 334 and 336 linked to it. The Host Controller 140 processes each Endpoint Descriptor by examining the queued Transfer Descriptors (if any) for that Endpoint Descriptor. The Transfer Descriptor is updated to reflect the work that was done, and the Host Controller moves on to the next Endpoint Descriptor. At some point, the work required by a Transfer Descriptor is completed by the Host Controller, and the Transfer Descriptor is transferred to the Done Queue, which is routinely processed by the Host Controller Driver.

The transport mechanism for USB data packets is via Transfer Descriptor queues linked to Endpoint Descriptor lists. The Host Controller Driver creates these data structures in the HCCA, then passes control to the Host Controller for processing. The Host Controller Driver is responsible for enqueuing and dequeuing Endpoint Descriptors. Enqueuing is done by adding the Endpoint Descriptor to the tail of the appropriate list. The Host Controller Driver is also responsible for enqueuing Transfer Descriptors to the appropriate Endpoint Descriptor. Enqueuing is done by adding the Transfer Descriptor to the tail of the appropriate queue.

The Host Controller operates on the Endpoint Descriptors and Transfer Descriptors enqueued by the Host Controller Driver. There are four types of transfers: interrupt, control, isochronous, and bulk. For interrupt and isochronous transfers, the Host Controller begins at the Interrupt Endpoint Descriptor head pointer for the current frame. The list is traversed sequentially until one packet transfer from the first Transfer Descriptor of all interrupt and isochronous Endpoint Descriptors scheduled in the current frame is attempted. For bulk and control transfers, the Host Controller begins in the respective list where it last left off. When the Host Controller reaches the end of a list, it loads the value from the head pointer and continues processing. The Host Controller processes n control transfers to 1 bulk transfer where the value of n is set by the Host Controller Driver. When a Transfer Descriptor completes, either successfully or due to an error condition, the Host Controller moves it to the Done Queue. Enqueuing on the Done Queue occurs by placing the most recently completed Transfer Descriptor at the head of the queue. The Done Queue is transferred periodically from the Host Controller to the Host Controller Driver via the HCCA.

The Host Controller is required to perform some periodic processing every USB frame. In other words, the Host Controller needs to process the current interrupt schedule and the isochronous schedule every frame. In addition, in order to meet the guidelines outlined in the USB Specification, the Host Controller must ensure that some portion of the frame is used to move the outstanding control and bulk transfers. When a new frame starts, the Host Controller processes control and bulk Endpoint Descriptors until the Remaining field of the HcFmRemaining register is less than or equal to the Start field of the HcPeriodicStart register. It then runs a periodic Endpoint Descriptor list by using the lower five bits of the current frame number as an index into HccaInterruptTable. Once this is complete, the Host Controller has fulfilled its obligated frame processing; it then fills the remaining frame time by processing the control and bulk Endpoint Descriptor lists. Therefore, for time scheduled events on USB, Host Controller Driver utilizes the various interrupt Endpoint Descriptor lists and other USB work is scheduled into either the control or bulk Endpoint Descriptor lists.

Note that the USB Specification also requires that control transfers must be favored over bulk transfers. This is accomplished by setting the ControlBulkServiceRatio field of the HcControl register to indicate the number of control transfers processed for each bulk transfer processed. The control and bulk Endpoint Descriptor lists are two separate lists which are each processed in a round robin fashion where n control Endpoint Descriptors are processed for every 1 bulk Endpoint Descriptor.

It is the responsibility of the Host Controller Driver to ensure that it does not schedule more periodic work then can fit in a frame. However, some PCs have latency issues that may cause USB bus bandwidth scheduling problems in some rare cases. If the Host Controller cannot complete its obligated frame processing before end of frame, the Host Controller increments ErrorFrameCounter in HcCommandStatus, which causes the Schedule Overrun interrupt status to be set. If this is unmasked, then an interrupt will occur.

TABLE 1

Endpoint Descriptor

| | 31 26 | 16 15 | 14 | 13 | 12 | 11 | 10 07 | 06 05 04 | 03 | 02 | 01 00 |
|---|---|---|---|---|---|---|---|---|---|---|---|
| Dword 0 | — | MPS | F | K | S | D | EN | FA | | | — |
| Dword 1 | | | TD Queue Tail Pointer (TailP) | | | | | | | | — |
| Dword 2 | | | TD Queue Head Pointer (HeadP) | | | | | | 0 | C | H |
| Dword 3 | | | Next Endpoint Descriptor (NextED) | | | | | | | | — |

TABLE 2

Field Definitions for Endpoint Descriptor

| Name | HC Access | Description |
|---|---|---|
| FA | R | FunctionAddress This is the USB address of the function containing the endpoint that this ED controls |
| EN | R | EndpointNumber This is the USB address of the endpoint within the function |
| D | R | Direction This 2-bit field indicates the direction of data flow (IN or OUT.) If neither IN nor OUT is specified, then the direction is determined from the PID field of the TD. The encoding of the bits of this field are:<br>Code    Direction<br><br>00b    Get direction From TD<br>01b    OUT<br>10b    IN<br>11b    Get direction From TD |
| S | R | Speed Indicates the speed of the endpoint: full-speed (S = 0) or low-speed (S = 1.) |
| K | R | Skip When this bit is set, the HC continues on to the next ED on the list without attempting access to the TD queue or issuing any USB token for the endpoint |
| F | R | Format This bit indicates the format of the TDs linked to this ED. If this is a Control, Bulk, or Interrupt Endpoint, then F = 0, indicating that the General TD format is used. If this is an Isochronous Endpoint, then F = 1, indicating that the isochronous TD format is used. |

TABLE 2-continued

Field Definitions for Endpoint Descriptor

| Name | HC Access | Description |
| --- | --- | --- |
| MPS | R | MaximumPacketSize This field indicates the maximum number of bytes that can be sent to or received from the endpoint in a single data packet |
| TailP | R | TDQueueTailPointer If TailP and HeadP are the same, then the list contains no TD that the HC can process. If TailP and HeadP are different, then the list contains a TD to be processed. |
| H | R/W | Halted This bit is set by the HC to indicate that processing of the TD queue on the endpoint is halted, usually due to an error in processing a TD. |
| C | R/W | ToggleCarry This bit is the data toggle carry bit. Whenever a TD is retired, this bit is written to contain the last data toggle value (LSb of data Toggle field) from the retired TD. This field is not used for Isochronous Endpoints |
| HeadP | R/W | TDQueueHeadPointer Points to the next TD to be processed for this endpoint. |
| NextED | R | NextED If nonzero, then this entry points to the next ED on the list |

Endpoint Descriptors (EDs) are linked in lists that are processed by the HC. An ED is linked to a next ED when the NextED field is nonzero.

When the Host Controller accesses an ED, it checks the sKip and the Halted bits to determine if any further processing of the ED is allowed. If either bit is set, then the Host Controller advances to the next ED on the list. If neither the sKip nor the Halted bit is set, then the Host Controller compares HeadP to TailP. If they are not the same, then the TD pointed to by HeadP defines a buffer to/from which the Host Controller will transfer a data packet.

This linking convention assumes that the Host Controller Driver queues to the 'tail' of the TD queue. It does this by linking a new TD to the TD pointed to by TailP and then updating TailP to point to the TD just added.

When processing of a TD is complete, the Host Controller 'retires' the TD by unlinking it from the ED and linking it to the Done Queue. When a TD is unlinked, NextTD of the TD is copied to HeadP of the ED.

The sKip bit is set and cleared by the Host Controller Driver when it wants the Host Controller to skip processing of the endpoint. This may be necessary when the Host Controller Driver must modify the value of HeadP and the overhead of removing the ED from its list is prohibitive.

The Halted bit is set by the Host Controller when it encounters an error in processing a TD. When the TD in error is moved to the Done Queue, the Host Controller updates HeadP and sets the Halted bit, causing the Host Controller to skip the ED until Halted is cleared. The Host Controller Driver clears the Halted bit when the error condition has been corrected and transfers to/from the endpoint should resume. The Host Controller Driver should not write to HeadP/toggleCarry/Halted unless Halted is set, sKip is set, or the ED has been removed from the list.

When TDs are queued to an ED, the Host Controller processes the TDs asynchronously with respect to processing by the host processor. Therefore, if the Host Controller Driver needs to alter the TD queue other than appending to the queue, it must stop the Host Controller from processing the TD queue for the endpoint so that changes can be made. The nominal mechanisms for stopping TD processing are for the Host Controller Driver to remove the ED from the list or to set the sKip bit in the ED.

When the D field of an ED is 10b (IN), the Host Controller may issue an IN token to the specified endpoint after it determines that HeadP and TailP are not the same. This indicates that a buffer exists for the data and that input of the endpoint data may occur in parallel with the HC's access of the ID which defines the memory buffer.

Since an ED must be aligned to a 16-byte boundary, the Host Controller only uses the upper 28 bits of Dword3 as a pointer to the next ED. TailP and HeadP point to TDs which may be either 16- or 32-byte aligned. The Host Controller uses only the upper 28 bits of Dword1 and Dword2 to point to a 16-byte aligned TD (F=0). If HeadP and TailP point to a TD that must be 32-byte aligned (F=1), then bit 4 of these Dwords must be 0.

A Transfer Descriptor (TD) is a system memory data structure that is used by the Host Controller to define a buffer of data that will be moved to or from an endpoint. TDs come in two types: general and isochronous. The General TD is used for Interrupt, Control, and Bulk Endpoints and an Isochronous TD is used to deal with the unique requirements of isochronous transfers. Two TD types are supported because the nature of isochronous transfers does not lend itself to the standard DMA buffer format and the packetizing of the buffer required for isochronous transfers is too restrictive for general transfer types.

Both the General TD and the Isochronous TD provide a means of specifying a buffer that is from 0 to 8,192 bytes long. Additionally, the data buffer described in a single TD can span up to two physically disjoint pages. Although the scatter/gather capabilities of a single TD are limited, it eliminates most of the problems associated with forcing buffers to be physically contiguous including the possibility of superfluous data movements.

Transfer Descriptors are linked to queues attached to EDs. The ED provides the endpoint address to/from which the TD data is to be transferred. The Host Controller Driver adds to the queue and the Host Controller removes from the queue. When the Host Controller removes a TD from a queue, it links the TD to the Done Queue. When a TD is unlinked from the ED and linked to the Done Queue, it is said to be 'retired'. A TD may be retired due to normal completion or because of an error condition. When the TD is retired, a condition code value is written in the TD that allows the Host Controller Driver to determine the reason it was retired.

A transfer is completed when the Host Controller successfully transfers, to or from an endpoint, the byte pointed to by BufferEnd. Upon successful completion, the Host Controller sets CurrentBufferPointer to zero, sets ConditionCode to NoError, and retires the General TD to the Done Queue.

The transfer may also complete when a data packet from an endpoint does not fill the buffer and is less than Maximum Packet Size bytes in length. In this case, CurrentBufferPointer is updated to point to the memory byte immediately after the last byte written to memory. Then, if the bufferRounding bit in the General TD is set, then this condition is treated as a normal completion and the Host Controller sets the ConditionCode field to NoError and retires the General TD to the Done Queue. If the bufferRounding bit in the General TD is not set, then this condition is treated as an error and the Host Controller sets the ConditionCode field to DataUnderrun and the Halted bit of the ED is set as the General TD is retired.

The Host Controller schedules transfers to endpoints on USB based on the structure of the four endpoint lists: bulk, control, interrupt, and isochronous. For bulk and control, the Host Controller maintains a software-accessible pointer to the head of the list. For interrupt, 32 list heads are kept in memory with a list selected each frame. The isochronous list is linked to the end of all of the interrupt lists. In addition to the head pointers, the Host Controller maintains three software-accessible pointers to the current ED for control, bulk, and an additional pointer that is used for both periodic lists (interrupt and isochronous.)

The Host Controller selects a list to process based on a priority algorithm. At the beginning of each frame, processing of the control and bulk list has priority until the HcFmRemaining counts down to the value in HcPeriodicStart. At that point, processing of the periodic lists has priority over control/bulk processing until either periodic list processing is complete or the frame time expires.

While control and bulk have priority, the Host Controller alternates processing of EDs on each of the lists. The setting of the Control Bulk Ratio field in HcControl determines the ratio of the number of control to bulk transactions that will be attempted. If CB is set to 00b, then the Host Controller allows one bulk transaction for each control transaction. If CB=11b, then the Host Controller allows one bulk transition after every 4 control transactions. If either the control or bulk lists is empty, then 100% of the control/bulk time is allocated to the list that is not empty.

The control and bulk lists are considered empty if either no EDs are linked to the list (the head pointer in the Host Controller contains a zero) or if all the TD queues of the EDs on the list are empty. To detect this empty condition, the Host Controller maintains two bits: control-filled (CF) and bulk-filled (BF) in the HcCommandStatus register. When the Host Controller starts processing at the head of the control or bulk list, it clears the corresponding filled bit. When the Host Controller finds an ED in the control or bulk list with a TD to be processed, it sets the corresponding filled bit. When the Host Controller reaches the end of the list, it checks the filled bit. If it is zero, then the list is empty and processing of the list stops. When the Host Controller Driver makes an addition to either the control or bulk lists, it must write to the corresponding filled bit to ensure that the Host Controller continues to process the list.

For a transfer to or from an endpoint to occur, a TD must be linked to the queue associated with the ED. HeadP and TailP in an ED define the TD queue. If HeadP and TailP are not the same, then HeadP is a pointer to the TD that will be processed when the Host Controller reaches the ED.

Software queues to the list by using the value of TailP to obtain the physical address of the last TD queued to the ED. Since the TD pointed to by TailP is not accessed by the HC, the Host Controller Driver can initialize that TD and link at least one other to it without creating a coherency or synchronization problem. After the new TDs are linked, TailP is updated, extending the list of TDs that can be accessed and processed by the HC, with TailP again pointing to a TD that can be initialized by software. Software may not alter in any way any of the TDs it has queued prior to the one pointed to by TailP until the Host Controller completes processing of the TD or the Host Controller Driver ensures that queue processing for the ED has been halted.

When the Host Controller finishes processing a TD, it copies the NextTD value from the just completed TD into HeadP of the ED. For a General TD, the Host Controller also sets the toggle Carry bit to the value of the last used data toggle for the endpoint and sets the Halted bit to 0 if the TD completed without error or to 1 if an error occurred.

As noted above, a disadvantage of the prior art is that a bulk endpoint transfer descriptor may potentially be processed many times in a given bus cycle, or frame. For example, if the burst communication adapter device, such as Ethernet interface device 160, does not have data to send to the HC when the transfer descriptor is processed, then the HC 140 will mark the Transfer Descriptor as being "in progress" and will return to the TD at the next available opportunity. This may result in the HC making numerous attempts to process the TD in a given cycle and across many cycles. This results in unnecessary consumption of HC 140 and USB 142 resources when a device has no data to send.

Another significant disadvantage of the prior art is associated with repeated processing of sJ the bulk TDs within a USB bus cycle. Each time the HC determines that the transfer defined by the TD is still in progress, it will cause the HC to cycle through the list of Endpoint Descriptors and Transfer Descriptors. Each time the HC cycles through the list it must retrieve the ED and TD data structures from the HCCA in shared system memory. The repeated data transfers from the system memory across the system data bus, e.g., a PCI system bus, is additional unnecessary consumption of system resources.

Figure 4:
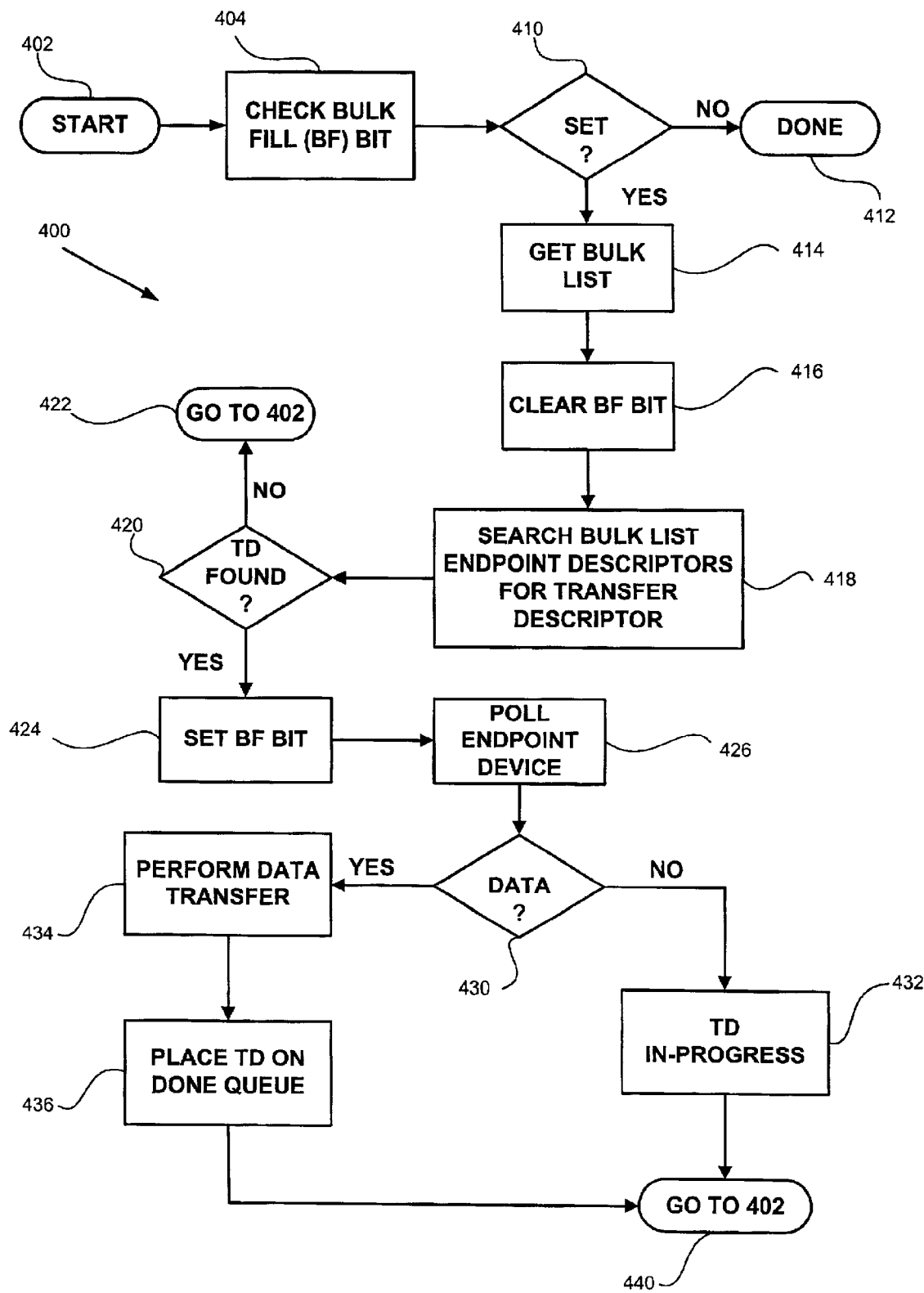
FIG. 4 is a control flow diagram illustrating an example of the bulk list processing typically performed by the host controller of FIG. 1.

FIG. 4 is a control flow diagram illustrating an example of a simplified control flow scenario 400 for the bulk list processing in the HC 140 that gives rise to the problem just described. In the prior art, in order to poll the Ethernet device 160 to determine if it has data, the HC driver in the host system adds a TD to the Bulk Channel Endpoint Descriptor in main memory 120 and sets the Bulk Fill (BF) bit. Subsequently, at the start, step 402, of an HC bulk transfer cycle, the HC 140 checks the BF bit, at step 404. If the BF bit is not set, then there are no TDs on the Bulk List and no further processing is needed, so control flow branches at step 410 to step 412 and the bulk transfer cycle is complete.

If the BF bit is set, then control flow branches at step 410 to step 414, where the HC 140 retrieves the Bulk List from main memory 120 (step 414), clears the BF bit (step 416), and searches the bulk list endpoint descriptors for a transfer descriptor (step 418). If no TD is found, then control flow branches at step 420 to step 422 and the bulk transfer cycle completes.

If a TD is found, then control flow branches to step 424, where the HC 140 sets the BF bit. The endpoint device corresponding to the endpoint descriptor to which the TD is linked is then polled for data (step 426). If the device has data to transfer via its bulk channel, then it responds accordingly and control flow branches at step 430 to step 434 where the bulk transfer is performed via USB 142. Once the transfer is completed, the TD is placed on the Done Queue (step 436) and the BF bit is cleared (step 438).

However, if the device does not have data to transfer, then control flow branches at step 430 to step 432, where the HC indicates that the TD is in-progress. Note that the BF bit remains set. This condition triggers the HC 140 to repeat the process until the endpoint device has data to transfer, thus permitting processing of the bulk list TD to be completed whereupon the TD can be placed on the Done Queue.

Figure 5:
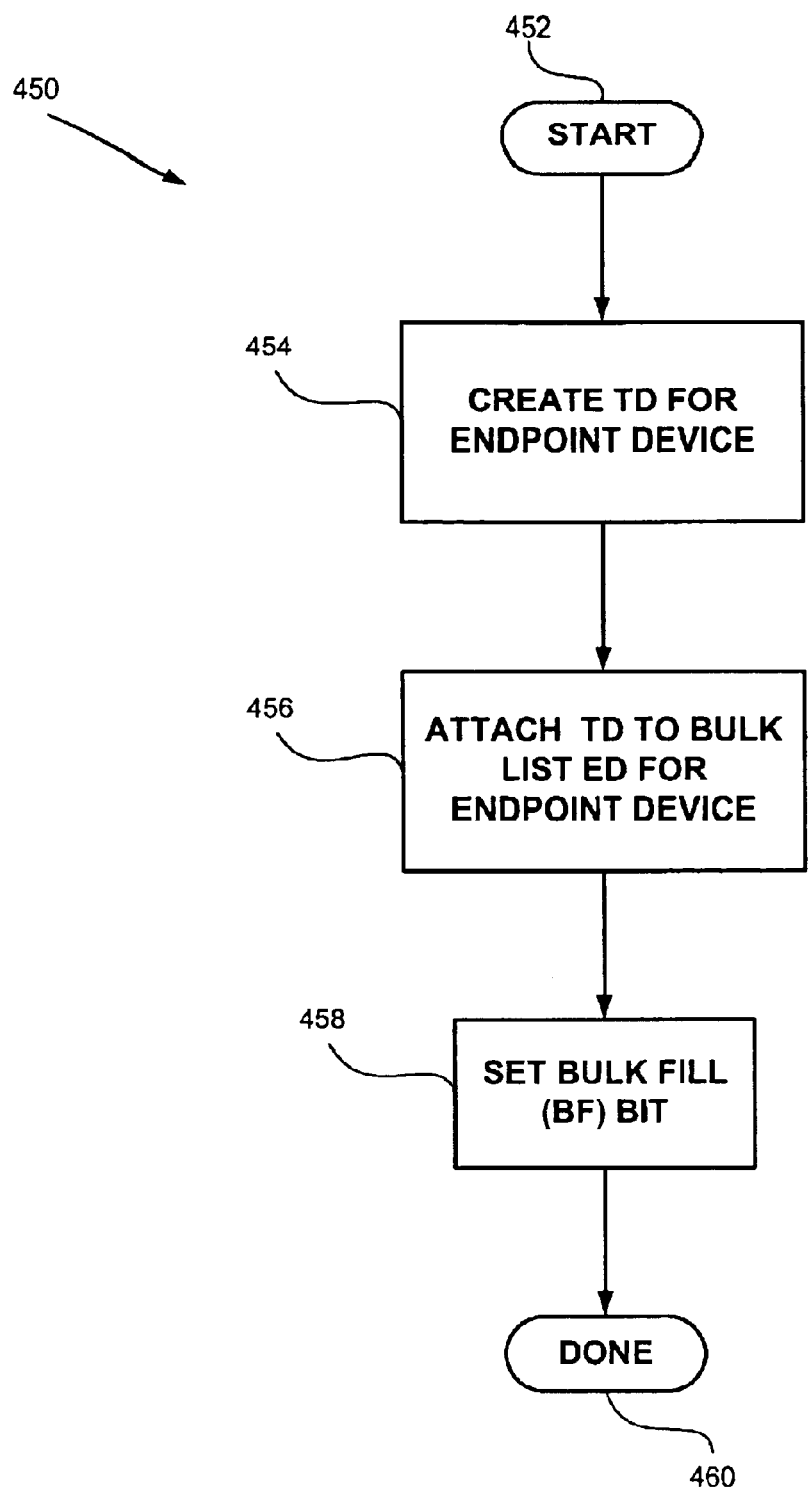
FIG. 5 is a control flow diagram illustrating an embodiment of a process in a class driver in the host system of FIG. 1, whereby the class driver polls an endpoint device for bulk transfer.

FIG. 5 is a control flow diagram illustrating an embodiment of a process 450 in a class driver in the host system of FIG. 1, wherein the class driver polls an endpoint device for bulk transfer. Process 450 is entered at step 452, which may be entered periodically or after the completion of processing of a bulk transfer. At step 454, the USB stack creates a TD for the endpoint device in response to a bulk-in read command and, at step 456, the USB stack attaches the TD to the Bulk List ED for the Endpoint Device. The HC driver then sets the Bulk Fill (BF) bit, at step 458, to indicate to the host controller 140 that there is a TD on the Bulk List awaiting processing. Subsequently, the process 400 of FIG. 4 will execute.

In the present invention, an improved burst communication adapter device for use on a USB bus is provided. In one embodiment of the present invention, the class driver for the bulk channel does not automatically request a read of the bulk endpoint. To do so would cause the USB stack to create a Transfer Descriptor (TD) and attach it to the Bulk List ED for the Ethernet In device 160, as illustrated in FIG. 5. Rather, the class driver (CD) for Ethernet device 160 requests a read of the interrupt endpoint. Alternatively, the burst adapter endpoint descriptors specify an interrupt schedule, and the USB stack ensures that the burst adapter device is polled in accordance with that schedule without the need for the CD to issue repeated interrupt read requests. In response to the interrupt channel poll, the Ethernet device 160 uses the USB Interrupt Channel to send a message to the class driver 214, via the host USB stack 216, that the Ethernet device has data to transmit on the USB 142. The interrupt message preferably includes the size of the data packet to be transmitted, or alternatively, the number of packets to be transmitted. Only then does the class driver respond by issuing a bulk endpoint read command, which in effect causes the USB stack 216 to configure a new bulk endpoint TD having buffer pointers of sufficient size for the data packet(s). The USB Host Controller 140 then processes the bulk endpoint TD, thereby inviting the Ethernet device 160 to transmit its data on the USB and responsively storing the data in a predetermined buffer.

Figure 6:
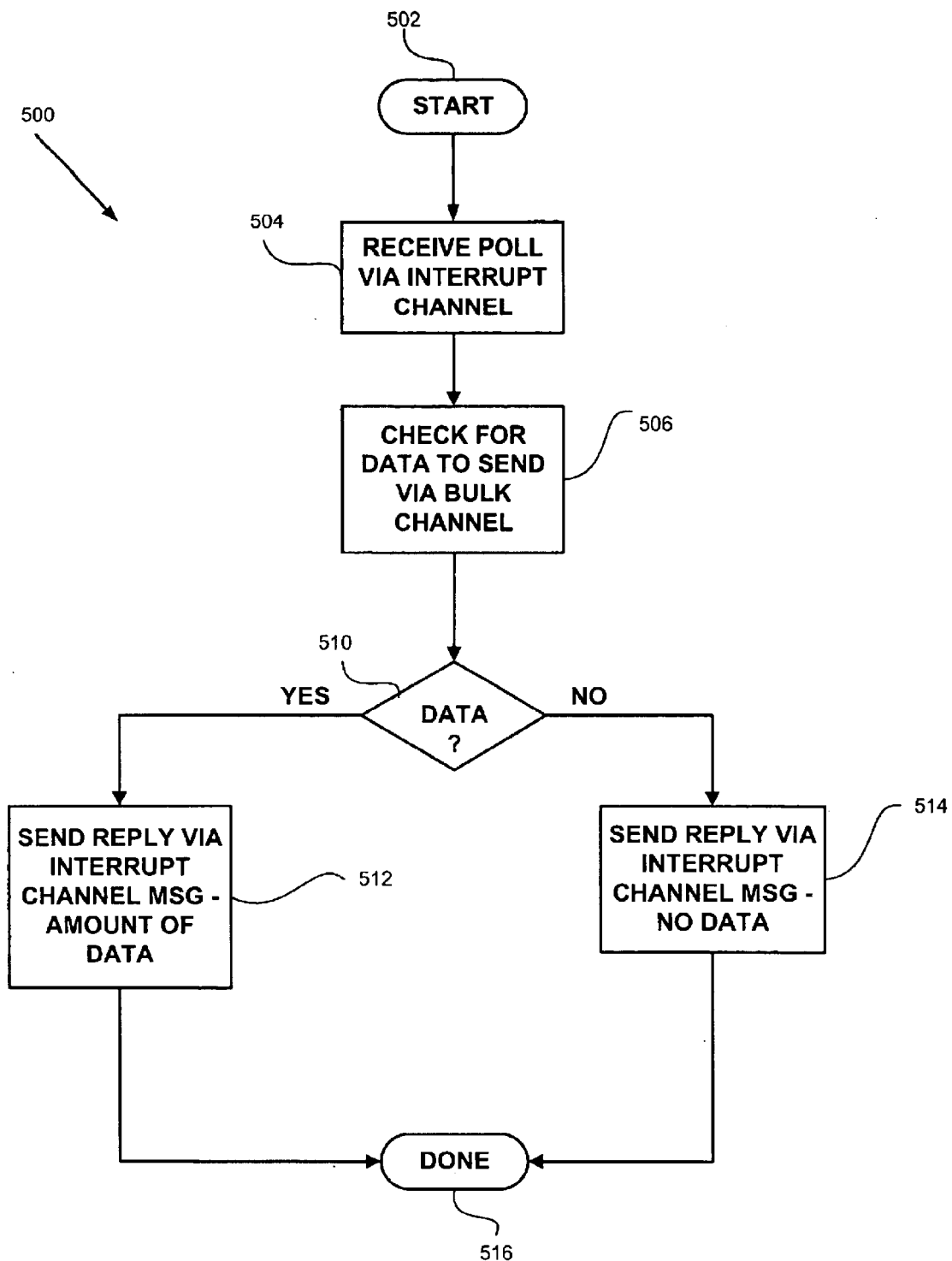
FIG. 6 is a control flow diagram illustrating an embodiment of a process in the endpoint device of FIG. 1, the endpoint device being adapted according to the present invention.

FIG. 6 is a control flow diagram illustrating an embodiment of a process 500 according to the present invention residing in an endpoint device on a USB, such as the Ethernet device 160 of FIG. 1. The present Endpoint Device includes an interrupt channel 224, as shown in FIG. 2, for receiving a polling message and replying with a message indicating that there is data to send, and in a further embodiment, the message includes the amount of data to send.

In process 500, when a poll interrupt message is received, at step 504, from HC 140 via the interrupt channel for the endpoint device, the burst adapter device checks to determine whether it has data waiting for transfer via the bulk channel (step 506). If the adapter device has data to send, then control flow branches at step 510 to step 512, where the device sends a reply as message via the interrupt channel, where the reply message indicates that there is data to send. This message may indicate the presence of data by setting a data-present flag bit indicating the presence of data. Alternatively, the message may include the amount of the data waiting to be transferred. In one embodiment, the message format preferably includes three bytes of data. The first two bytes provide status information about the burst communication link (e.g., the ethernet link is active), while the third byte indicates the length (e.g., in bits, nibbles, bytes, words, or other data length increment) of the burst link data packet that needs to be conveyed to the host. The message format may include additional bytes to specify a larger number packet sizes. In a further embodiment, the data-length indicator may indicate the number of packets waiting to be sent.

If the device does not have burst link data to send, then control flow branches to step 514, where a reply message is sent indicating that the device has no data to send. This message may include a data-present flag indicating no data, or alternatively would indicate a data size of zero bytes or zero packets. Alternatively, no message is sent and the HCD of the host USB stack interprets no reply from the device to indicate no data.

Figure 7:
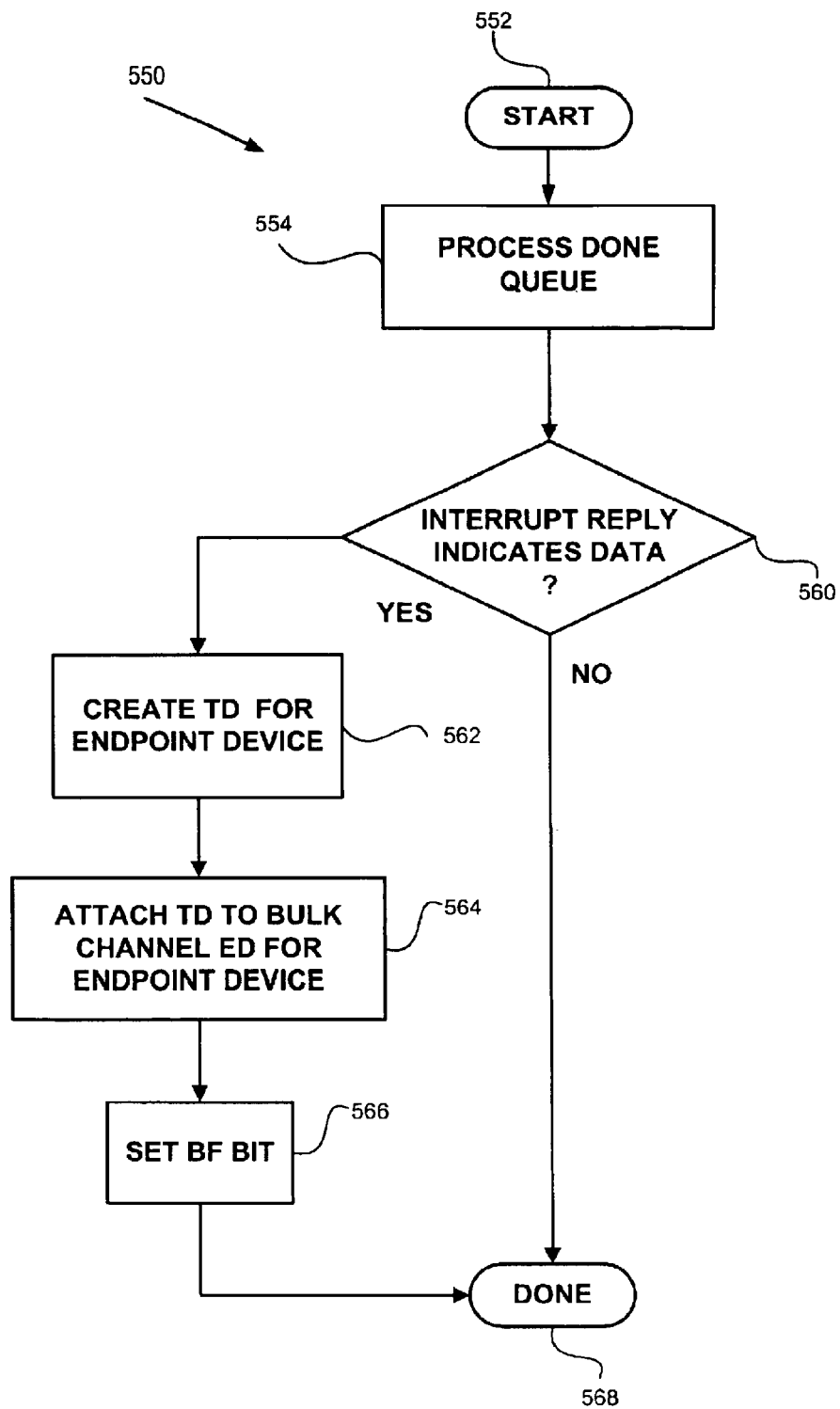
FIG. 7 is a control flow diagram illustrating an embodiment of a process in a class driver of the host system of FIGS. 1 and 2, the class driver being adapted according to the present invention to process an interrupt reply message from the endpoint device.

FIG. 7 is a control flow diagram illustrating an embodiment of a process 550 according to the present invention. At step 554, the HC processes the done queue and informs the Class Driver (CD) 214 (by way of the USB stack 216) that the CD's read interrupt endpoint command has been completed successfully. The CD checks the interrupt channel reply message sent from the endpoint device at step 512 or 514 of FIG. 6. At step 560, if the message indicates that there is no data to send, then the CD completes the processing for the completed interrupt message and control flow branches to step 568.

If the reply message has been received and it indicates the endpoint device has data to transfer, then control flow branches to step 562, where the CD issues a bulk endpoint read, thereby causing the USB stack to create a bulklist TD (step 562) that specifies the size of the data transfer as indicated in the reply message from the endpoint device. The class driver specifies the amount of data to transfer in accordance with the particular embodiment described above. If the interrupt message indicates only the presence of data, then the class driver may be configured to specify a default size buffer, which in the case of an ethernet adapter device, is preferably the maximum size of an ethernet packet (approximately 1500 bytes). If the interrupt message includes the number of data packets, then the class driver may be configured to issue a plurality of bulk-in read commands, one for each packet, where each one specifies a default size packet (or each one may be custom sized).

The USB stack then attaches only those TDs necessary for the requested data transfer to the bulk channel endpoint descriptor for the endpoint device, step 564, and sets the BF bit, step 566, before completing processing, step 568. Note that the TD(s) created at step 562 may specify a predetermined buffer size, such as a maximum packet size for the endpoint device or a maximum size for the ED. Preferably, the endpoint device process in FIG. 6 may be configured to include the amount of data to be sent and the TD created at step 562 allocates a buffer size corresponding to the amount of data indicated in the response from the endpoint device.

Figure 8:
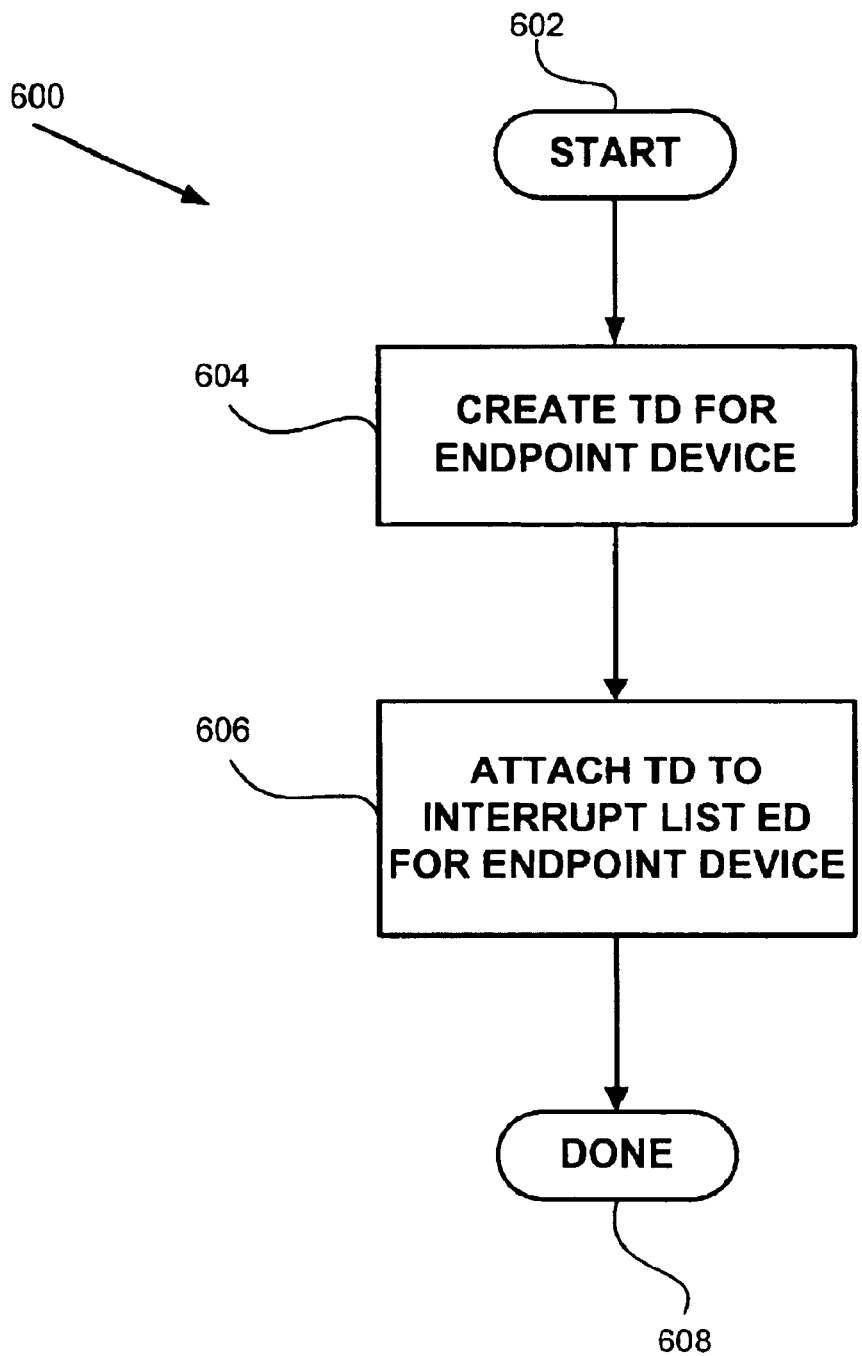
FIG. 8 is a control flow diagram illustrating an embodiment of a process in the class driver of the host system of FIGS. 1 and 2, the class driver being adapted according to the present invention to poll the endpoint device via the interrupt channel.

Note that class driver 214 and/or USB stack 216 is configured to poll the endpoint device via the interrupt channel. FIG. 8 is a control flow diagram for an embodiment of a process 600, according to the present invention, that creates a TD for the endpoint device (step 604) and attaches the TD to an Interrupt List ED for the endpoint device (step 606). The process 600 may be repeated or the TD may be left on the Interrupt List ED for periodic polling. Also, the frequency of the pooling cycle may be determined through the choice of the interrupt List, e.g. ranging from 1 msec. to 32 msec. scheduling. See section 5.2.7.2 of the OpenHCI Specification release 1.0a for further details regarding interrupt scheduling.

Subsequently, HC 140 will perform process 400 of FIG. 4. Because the BF bit is only set if there is a device waiting to send data (for simplicity, it is assumed no other bulk endpoint device is present), process 400 will only run when the TDs on the EDs of the bulk list have been created in response to the interrupt message. Therefore, control flow will always branch at step 430 to step 434 such that the data transfer is performed, the TD is placed on the Done Queue., and the BF bit is eventually cleared. Thus, the problem in the prior art of performing excess cycles for the bulk list, or another type of list, when the endpoint device has no data to send may be avoided. In this case, no change to the processing performed by the HC 140 is necessary.

The present invention provides an efficient method and system for transferring data over a USB. An Endpoint Device, such as an Ethernet Adapter for communicating with an Ethernet based network, coupled to a USB is configured with an interrupt channel for communication with a host controller coupled to the USB. The Endpoint Device is further configured to receive a polling message in accordance with the present invention. The Endpoint Device sends a reply to the host controller via the interrupt channel that is forwarded to the class driver to indicate that it has data to send via the bulk channel. The class driver is configured to respond to the reply from the Endpoint Device by issuing a bulk endpoint read request for the Endpoint Device. Subsequently, the Endpoint Device is polled by the host controller to perform a bulk transfer of the data. The Endpoint Device and class driver according to the present invention thereby avoid the bulk list cycling problem associated with the prior art.

In view of the wide variety of embodiments to which the principles of the invention can be applied, it should be understood that the illustrated embodiment is exemplary only, and should not be taken as limiting the scope of the present invention. For example, one of ordinary skill in the art will readily appreciate that various elements of the present invention can be practiced with software, hardware, or a combination thereof. Also, one of ordinary skill in the art will readily appreciate that the present approach may be applied to channels other than the bulk channel and using other channels for messaging besides the interrupt channel. Various steps performed by the software may be performed by software modules other than those described above. Furthermore, with regard to the flow control diagrams described herein, more or fewer steps can be taken and some steps may be combined or taken in a different order without departing from The claims should not be read as limited to the described order or elements unless stated to that effect. Therefore, all embodiments that come within the scope and spirit of the following claims and equivalents thereto are claimed as the invention.

I claim:

1. A method for transferring data over a Universal Serial Bus (USB), the method comprising the steps of:
   polling a burst communication adapter device coupled to the USB using a first type of channel for the burst communication adapter device;
   receiving a rely message from the burst communication adapter device, the reply message indicating that the burst communication adapter device has data for transfer via a second type of charnel for the burst communication adapter device; and
   responsive to receiving the reply message, issuing a bulk channel read request for the burst communication adapter device.

2. The method of claim 1, wherein the reply message includes an amount of data that the burst communication adapter device has to transfer via the USB; and further comprising the step of creating a Transfer Descriptor (TD) and linking the TD to an Endpoint Descriptor corresponding to the second type of channel for the burst communication adapter device,
   wherein the TD specifies the amount of data included in the reply message from the burst communication adapter device.

3. The method of claim 1, where the first type of channel for the burst communication adapt device further comprises an Interrupt channel.

4. The method of claim 3, where the second type of channel for the burst communication adapter further comprises a Bulk channel.

5. A computer readable medium having stored therein instructions for causing a central processing unit to execute the method of claim 4.

6. A computer readable medium having stored therein instructions for causing a central pro sing unit to execute the method of claim 1.

7. The method of claim 1 wherein the second type of channel is a Bulk channel and further comprising the step of creating a Bulk List Transfer Descriptor (TD) and linking the TD to an Endpoint Descriptor corresponding to the second type of channel for the burst communication adapter device.

8. A system for transferring data via a Universal Serial Bus (USB), the system comprising:
   a host system bus;
   a memory device coupled to the host system bus;
   a Universal Serial Bus (USB);
   a host controller coupled to the host system bus and the USB, the host controller being configured to process communications between the USB and the host system bus according to a predetermined endpoint descriptor list residing in the memory device;
   a burst communication adapter device coupled to the USB, the burst communication adapter device being configured to receive a polling message via a first type of channel of the USB and, respective thereto, send a reply message when the burst communication adapter device has data for transfer via a second type of channel of the USB, where the second type of channel of the USB corresponds to the predetermined endpoint descriptor list; and
   a microprocessor coupled to the host system bus, the microprocessor having a class driver configured to send the polling message through the first type of channel of the USB via the host controller, the class driver being further configured to receive the reply message and, responsive thereto, create a transfer descriptor and attach the transfer descriptor to the predetermined endpoint descriptor list.

9. The system of claim 8, where:
   the burst communication adapter device is further configured to include in the reply message an amount of data that the burst communication adapter device has to transfer via the second type of channel of the USB; and
   the class drive is further configured to specify the amount of data include in the reply message in the transfer descriptor.

10. The system of claim 8, where the first type of channel of the USB further comprises an Interrupt channel for the burst communication adapter device.

11. The system of claim 8, where the second type of channel of the USB further comprise a Bulk channel for the burst communication adapter device.

12. A system for managing data communications via a Universal serial bus (USB) the system comprising:
   a burst commination adapter device configured to be coupled to the USB, the burst communication adapter device being configured to receive a polling message via a first type of channel of the USB and, responsive thereto, send a reply message when the burst communication adapter device has data for transfer via a second type of channel of the USB, where the second type of channel of the burst communication adapter device corresponds to a predetermined endpoint descriptor list; and a class driver configured to execute on a host system that includes a host controller coupled to the USB, the class driver being configured to send the polling message through the first type of channel of the USB via the host controller, the class driver being further configured to receive the reply message and, responsive thereto, create a transfer descriptor and attach the transfer descriptor to the predetermined endpoint descriptor list.

13. The system of claim 12, where:

the bust communication adapter device is further configured to include in the reply message an amount of data that the burst communication adapter device has to transfer via the second type of channel of the USB; and the class drive is further configured to specify the amount of data included in the reply message in the transfer descriptor.

14. The system of claim 12, where the first type of chapel of the USB further comprises an Interrupt channel for the burst communication adapter device.

15. The system of claim 12, where the second type of channel of the USB further comprise a Bulk channel for the burst communication adapter device.

16. A universal serial bus (USB) communications adapter comprising:

an ethernet physical layer transceiver having an associated ethernet MAC protocol process, a USB driver in communication with said MAC process, said USB driver including an interrupt channel process and a bulk transfer channel process, a USB physical layer in communication with said USB driver, said USB physical layer being adapted for communication with a USB host device, wherein upon receipt of an ethernet packet addressed to said universal serial bus communications adapter, said universal serial bus communications adapter transmits a data present signal via said interrupt channel process.

17. The universal serial bus communications adapter of claim 16 wherein the data present signal comprises a data present flag bit.

18. The universal serial bus communications adapter of claim 16 wherein the data present signal indicates the number of data packets to be sent.

19. The universal serial bus communications adapter of claim 16 wherein the data present signal indicates the amount of data to be sent.

20. The universal serial bus communications adapter of claim 16 further comprising a class driver software module adapted for running on a host computing platform, wherein said class driver software module includes instructions to issue a bulk-in read communication in response to the data present signal.

* * * * *

UNITED STATES PATENT AND TRADEMARK OFFICE
CERTIFICATE OF CORRECTION

PATENT NO. : 6,842,797 B1
APPLICATION NO. : 09/685287
DATED : January 11, 2005
INVENTOR(S) : Sachin Lawande It is certified that error appears in the above-identified patent and that said Letters Patent is hereby corrected as shown below:

In column 13 line 49, replace the word "rely" with --reply--.

In column 13 line 52, replace the word "charnel" with --channel--.

In column 14 line 11, replace the words "pro sing" with --processing--.

In coumn 14 line 33, replace the word "respective" with --responsive--.

In column 14 line 62, replace the words "serial bus" with --Serial Bus--.

In column 14 line 63, replace the word "commination" with --communication--.

In column 15 line 16, replace the word "bust" with --bus--.

In column 15 line 20, replace the word "communication" with --command--.

In column 15 line 24, replace the word "chapel" with --channel--.

Signed and Sealed this

Twenty-third Day of January, 2007

JON W. DUDAS
*Director of the United States Patent and Trademark Office*